UNITED STATES PATENT OFFICE.

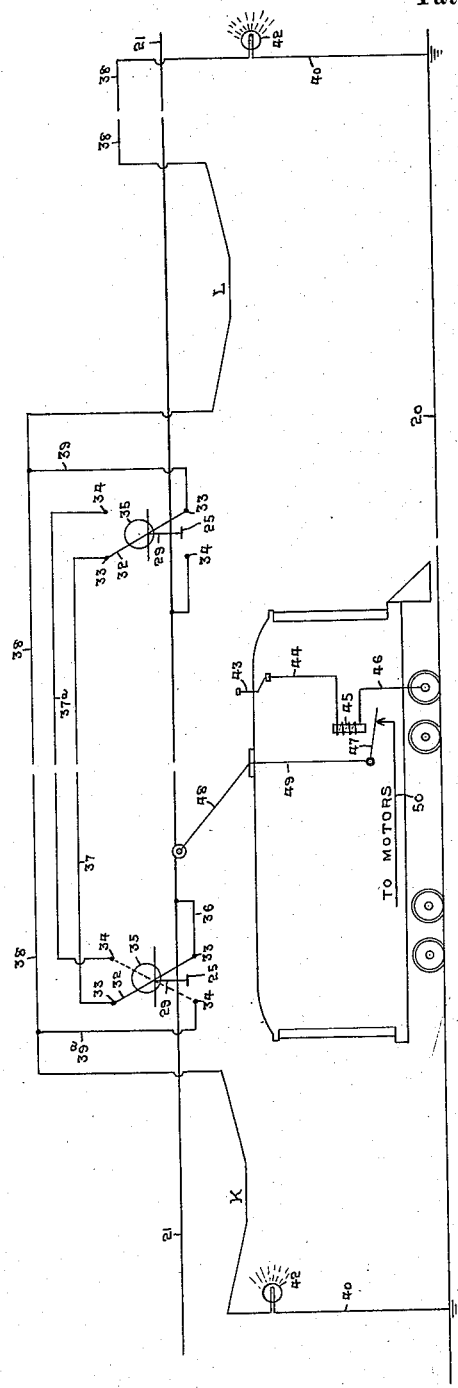
P. L. BAILEY.
SAFETY SYSTEM FOR ELECTRIC RAILWAYS.
APPLICATION FILED MAY 9, 1911.
1,156,046.  Patented Oct. 12, 1915.

PARIS L. BAILEY, OF INDIANAPOLIS, INDIANA.

SAFETY SYSTEM FOR ELECTRIC RAILWAYS.

1,156,046.   Specification of Letters Patent.   Patented Oct. 12, 1915.

Application filed May 9, 1911. Serial No. 626,029.

*To all whom it may concern:*

Be it known that I, PARIS L. BAILEY, a citizen of the United States, residing at Indianapolis, in the county of Marion and State of Indiana, have invented certain new and useful Improvements in Safety Systems for Electric Railways, of which the following is a specification.

This invention relates to an automatic control or safety system for minimizing the dangers that surround the operation of electric cars on traction lines; and the object of the invention consists in the provision of a safety system whereby, when orders for operating through cars in either direction or for meeting an approaching car at a given siding are forgotten or disregarded on part of one or either of the crews of said cars, the electricity, for the operation of said cars, will be automatically cut off and the brakes simultaneously set.

A further object of the invention is to provide means so that in case a crew forgets or disregards the order for meeting an approaching car at a given siding, the car when reaching a predetermined position relatively to said meeting point will cause a danger signal, consisting of a suitable semaphore or lamp, to be displayed in advance of the car, in order to warn the crew of a car approaching from the opposite direction, and a similar signal will be displayed a certain distance in the rear of the car to warn the crew of a car that may be following, and thereby prevent a collision.

A further object of the invention is to provide means whereby in case the car having the right-of-way reaches the meeting point before the other car ordered to take the siding arrives, and the crew of said last car forget the order for taking the siding at said point, or should the crew of said car disregard the danger signal set against it, the approaching car will contact a certain wire of a circuit previously closed by the waiting car which will cause the motive power on the approaching car to be automatically cut off and the brakes applied and thereby prevent an imminent collision.

I accomplished the above objects of the invention by means of the safety system illustrated in the accompanying drawing, forming a part hereof, in which the figure is a diagrammatic view of my automatic control or safety system for governing the operation of electric cars.

Referring to the figure, reading from left to right, suppose a car enters the block, the trolley wheel, by actuating the shoe 25 and the arm 29 will move the arm 32 in the first breaker from the position shown by means of the dotted line, at the left hand end of the figure, away from the contact-plates 34, 34 to and upon the contact-plates 33, 33. This movement of the arm 32 closes the secondary circuit in this block. The secondary H. BEHREND.
BALL GAME DEVICE.
APPLICATION FILED JULY 5, 1910.
1,156,047.
Patented Oct. 12, 1915.
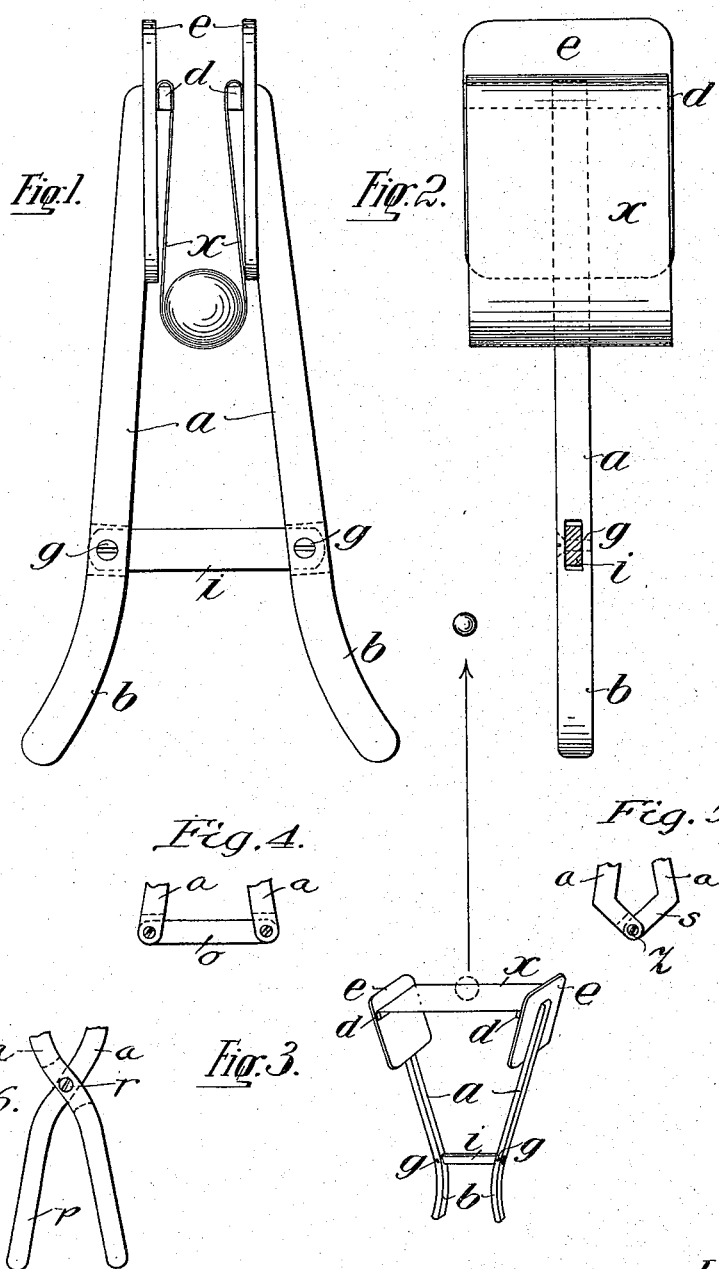

Referring to the drawing, 20 represents the track over which the cars are operated, and 21 the old and well known trolley wire. The safety system for operating the cars consists of certain arrangement of wires located at each end of a section of the main track for preventing approaching cars from entering the section or on each side of a siding where electric cars are ordered off of the main track 20 to permit an approaching car to pass, it being understood that this system is particularly applicable to be used on electric railways operating over a single track. The wires for governing or controlling the movement of the cars are arranged over certain portions of the track or on each side of a siding, and those portions of the track may be designated as "blocks." When a car enters one of said blocks, the trolley wheel comes into contact with a shoe 25 which is arranged and operates in and is carried by a circular frame 35 suspended above the track near the terminals of a block. The shoe 25 is provided with an integrally formed vertically disposed arm 29 which passes through the circular frame 35 and connects with suitable mechanism for actuating the metallic arm 32. When the trolley wheel engages the shoe 25, the latter is elevated, and by means of the connection between the arm 29 and the arm 32, the metallic arm 32 is rotated so as to move from the contact-plates 34, 34 to the contact-plates 33, 33. These contact-plates are carried by a circular frame 35 and for convenience may be called a "circuit-breaker." Each block is provided with two of these breakers. When the arm 32 is moved from one set of the contact-plates to the other set of contact-plates of a breaker, the secondary circuit is closed or open, this depending whether the car is entering or is leaving the block. The arrangement and operation of the mechanism of these breakers, for opening and closing the secondary circuits, will be more fully hereinafter described.